(12) United States Patent
Nield et al.

(10) Patent No.: US 10,683,731 B2
(45) Date of Patent: Jun. 16, 2020

(54) DRILL RIG AND METHOD FOR OPERATING A DRILL RIG

(71) Applicants: Barry J. Nield, Jacksonville Beach, FL (US); George A. Nield, Jacksonville Beach, FL (US)

(72) Inventors: Barry J. Nield, Jacksonville Beach, FL (US); George A. Nield, Jacksonville Beach, FL (US)

( * ) Notice: Subject to any disclaimer, the term of this patent is extended or adjusted under 35 U.S.C. 154(b) by 334 days.

(21) Appl. No.: 15/676,056

(22) Filed: Aug. 14, 2017

(65) Prior Publication Data

US 2019/0048688 A1    Feb. 14, 2019

(51) Int. Cl.
  *E21B 41/00*   (2006.01)
  *G05B 15/02*   (2006.01)
  *E21B 7/02*    (2006.01)
  *E21B 44/00*   (2006.01)

(52) U.S. Cl.
  CPC .......... *E21B 41/0021* (2013.01); *E21B 7/022* (2013.01); *E21B 7/024* (2013.01); *G05B 15/02* (2013.01); *E21B 44/00* (2013.01)

(58) Field of Classification Search
  CPC ...... E21B 41/0021; E21B 44/00; E21B 7/022; E21B 7/024; G05B 15/02
  See application file for complete search history.

(56) References Cited

U.S. PATENT DOCUMENTS

| 4,187,546 | A | * | 2/1980 | Heffernan | E21B 19/20 173/2 |
| 4,269,554 | A | * | 5/1981 | Jackson | E21B 19/14 294/102.2 |
| 4,591,006 | A | * | 5/1986 | Hutchison | E21B 19/20 175/52 |
| 5,107,705 | A | * | 4/1992 | Wraight | E21B 19/20 348/85 |
| 5,274,552 | A | * | 12/1993 | Milburn | E21B 47/04 702/9 |
| 2003/0029641 | A1 | * | 2/2003 | Meehan | E21B 17/025 175/57 |
| 2005/0055163 | A1 | * | 3/2005 | Hopper | E21B 41/00 702/6 |
| 2006/0108113 | A1 | * | 5/2006 | Scott | B01D 33/0376 166/255.1 |
| 2009/0133881 | A1 | * | 5/2009 | Roodenburg | B63B 17/00 166/355 |

(Continued)

*Primary Examiner* — Emmanuel M Marcelo
(74) *Attorney, Agent, or Firm* — Steve LeBlanc, LLC

(57) ABSTRACT

A drill rig includes a drawworks having a drum operably connected to a drive system and a brake. A drill string extends from the drum of the drawworks, along a derrick, to a block and tackle arrangement holding a travelling block so that operation of the drawworks causes the drum to release or retract the drill string. A travelling block controller controls the operation of the drawworks. An interlock sensor senses a sensed parameter, and the sensed parameter is at least one of a drill rig parameter, a drawworks parameter, or a travelling block controller parameter. An interlock signal generated by the interlock sensor is reflective of the sensed parameter. An interlock operably connected to the travelling block controller receives the interlock signal and disables operation of at least one of the travelling block controller or the drawworks if the interlock signal meets a predetermined criteria.

13 Claims, 3 Drawing Sheets

(56) References Cited

U.S. PATENT DOCUMENTS

| | | | |
|---|---|---|---|
| 2011/0174538 A1* | 7/2011 | Chan | E21B 19/08 175/24 |
| 2013/0118807 A1* | 5/2013 | Yang | E21B 7/06 175/24 |
| 2014/0060931 A1* | 3/2014 | Pettapiece | E21B 44/00 175/27 |
| 2016/0083228 A1* | 3/2016 | Holck | E21B 19/09 414/138.2 |
| 2017/0234119 A1* | 8/2017 | Allen | E21B 15/00 700/275 |

* cited by examiner

DRILL RIG AND METHOD FOR OPERATING A DRILL RIG

FIELD OF THE INVENTION

The present invention generally involves a drill rig and a method for operating the drill rig. Particular embodiments of the present invention may be incorporated into land-based or offshore drill rigs used for gas production and/or well service operation to reduce or prevent personnel injury or equipment damage during manual or automatic operation of the drill rig.

BACKGROUND OF THE INVENTION

Drill rigs are commonly used in oil and gas production and well service operations to bore substantial distances below the earth's surface. A drill rig generally includes a drawworks for raising and lowering a drill string in a borehole. The drawworks generally includes a large drum or spool that holds the drill string. The drill string extends from the drum to a derrick that supports a block and tackle arrangement holding a travelling block. The travelling block provides a mechanical advantage for raising and lowering the drill string in the borehole. A clutch releasably connects a drive system to the drum to rotate the drum to reel in the drill string. To lower the drill string, the clutch may disengage the drive train from the drum, and a brake connected to the drum may be released to allow the weight of the drill string to rotate the drum to release drill string from the drum.

The size and weight of the drill rig, drawworks, and travelling block often approaches or exceeds one hundred tons, depending on the particular application. In particular applications, for example, the drill string alone may weigh several hundred tons, depending on the depth of the borehole and drilling equipment attached to the drill string. As a result, many drill rigs include a travelling block controller that applies operating limits to safely control the operation of the drawworks to reduce or eliminate catastrophic equipment damage or personal injury.

The drill rig is often located on a mobile platform to allow convenient relocation of the drill rig to a particular drill site. During relocation, the derrick and other large components associated with the drawworks may be collapsed, retracted, or disassembled to facilitate transportation on the mobile platform. Once the mobile platform is relocated, the components are then re-assembled to support the desired drilling operations.

While the mobile platform enhances portability of the drill rig to various locations, the enhanced portability also introduces additional dangers to an already dangerous operation. For example, the relocated mobile platform should be as level as possible to ensure even distribution of the extremely large forces placed on the derrick. In addition, the derrick and other large components associated with the drawworks must be properly re-assembled and fully operational to ensure safe operation of the drill rig. While additional procedures may be implemented to address these and other additional dangers, inadvertent errors or procedural omissions may increase the chance of a catastrophic failure. Therefore, the need exists for an improved drill rig and method for operating the drill rig that incorporates one or more interlocks to ensure safe and reliable operation of the drill rig.

BRIEF DESCRIPTION OF THE INVENTION

Aspects and advantages of the invention are set forth below in the following description, or may be obvious from the description, or may be learned through practice of the invention.

One embodiment of the present invention is a drill rig that includes a drawworks having a drum operably connected to a drive system and a brake. A drill string extends from the drum of the drawworks, along a derrick, to a block and tackle arrangement holding a travelling block so that operation of the drawworks causes the drum to release or retract the drill string. A travelling block controller controls the operation of the drawworks. An interlock sensor senses a sensed parameter, and the sensed parameter is at least one of a drill rig parameter, a drawworks parameter, or a travelling block controller parameter. An interlock signal generated by the interlock sensor is reflective of the sensed parameter. An interlock operably connected to the travelling block controller receives the interlock signal and disables operation of at least one of the travelling block controller or the drawworks if the interlock signal meets a predetermined criteria.

An alternate embodiment of the present invention is a drill rig that includes a drawworks having a drum operably connected to a drive system and a brake. A drill string extends from the drum of the drawworks, along a derrick, to a block and tackle arrangement holding a travelling block so that operation of the drawworks causes the drum to release or retract the drill string. A travelling block controller controls the operation of the drawworks. An interlock sensor generates an interlock signal reflective of at least one of a horizontal angle of the drill rig, a locked condition of the derrick that prevents the derrick from retracting, a fluid pressure for operating the drawworks, or an operating limit for the drawworks set into the travelling block controller. An interlock operably connected to the travelling block controller receives the interlock signal and disables operation of at least one of the travelling block controller or the drawworks if the interlock signal meets a predetermined criteria.

In yet another embodiment of the present invention, a method for operating a drill rig includes energizing a travelling block controller that controls the operation of a drawworks. The method further includes generating an interlock signal reflective of at least one of a horizontal angle of the drill rig, a locked condition of a derrick that prevents the derrick from retracting, a fluid pressure for operating the drawworks, or an operating limit set into the travelling block controller. The method also includes disabling operation of at least one of the travelling block controller or the drawworks if the interlock signal meets a predetermined criteria.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
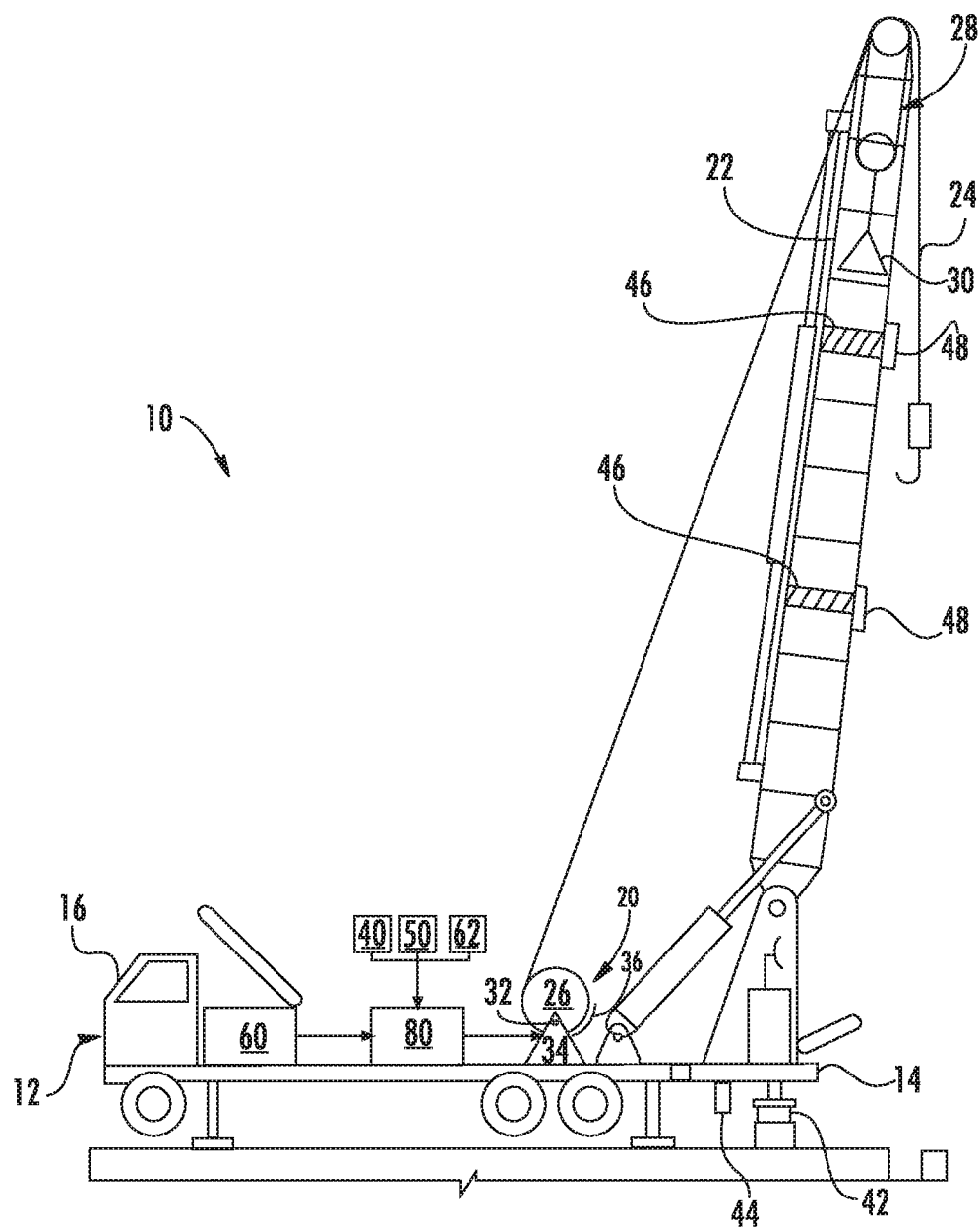
FIG. 1 is a representative drawing of a drill rig according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a drill rig and method for operating the drill rig that incorporates one or more interlocks to ensure safe and reliable operation of the drill rig. Referring now to the drawings, wherein identical numerals indicate the same elements throughout the figures, FIG. 1 provides a representative drawing of a drill rig 10 according to one embodiment of the present invention, and FIG. 2 provides a functional block diagram of the drill rig 10 shown in FIG. 1.

Figure 2:
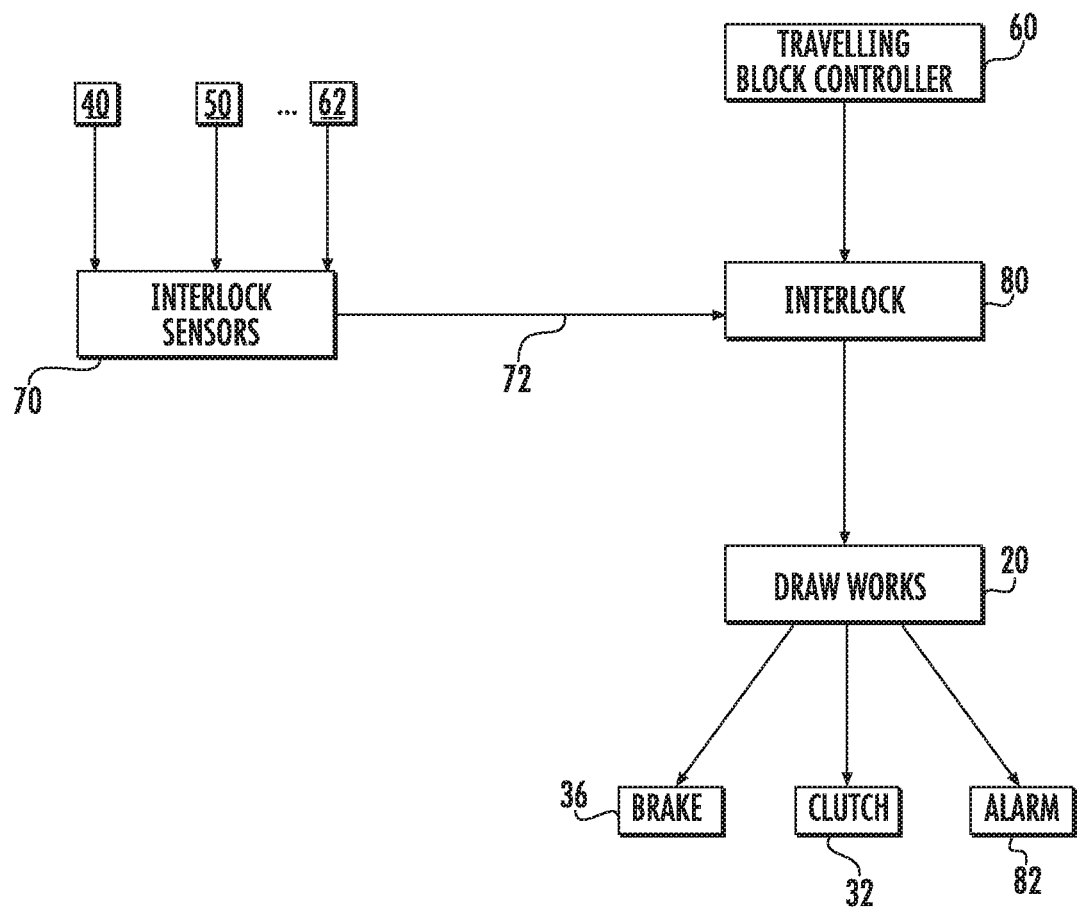
FIG. 2 is a functional block diagram of the drill rig shown in FIG. 1.

As shown in FIG. 1, the drill rig 10 may be mounted on a mobile platform 12 to enable relocation of drill rig 10 to a particular drilling location. For land-based operations, for example, the mobile platform 12 may be a flatbed trailer 14 connected to vehicle 16. For water-borne operations, the mobile platform 12 may be a barge or other buoyant vessel that can support the weight of the drill rig 10 during relocation and drilling operations.

The drill rig 10 generally includes a drawworks 20 and associated derrick 22 for raising and lowering a drill string 24 in a borehole. The drill string 24 may be wound on a drum 26 and extend along the derrick 22 to a block and tackle arrangement 28 holding a travelling block 30. A clutch 32 may releasably connect a drive system 34 to the drum 26 to allow the drive system 34 to rotate the drum 26 to reel in the drill string 24. To lower the drill string 24, the clutch 32 may disengage the drive system 34 from the drum 26, and a brake 36 connected to the drum 26 may be released to allow the weight of the drill string 24 to rotate the drum 26 to release drill string 24 from the drum 26. Using this arrangement, as is well-known in the industry, operation of the drawworks 20 causes the drum 26 to release or retract the drill string 24 as desired for the drilling operations.

As used herein, a "drill rig parameter" 40 is a sensed parameter that reflects a static condition of the drill rig 10. For example, once the mobile platform 12 has been relocated to a particular drilling location, jacks 42 may be used to horizontally level the drill rig 10 to ensure that weights associated with the drilling operations are evenly distributed. A level sensor 44 may measure a horizontal angle of the drill rig 10 and generate a signal reflective of the horizontal angle of the drill rig 10. Similarly, the derrick 22 may be raised, extended, and locked into a static position using one or more locking pins or clamps 46 to prevent the derrick 22 from retracting. A lock sensor 48 may detect the proper installation of the locking pins 46 and generate a signal reflective of the locked or unlocked condition of the derrick 22. In this manner, the level sensor 44 and lock sensor 48 generate signals reflective of sensed drill rig parameters 40 that reflect the static condition of the drill rig 12.

As used herein, a "drawworks parameter" 50 is a sensed parameter that reflect an operating parameter of the drawworks 20. For example, the drawworks 20 may utilize various electrical, pneumatic, or hydraulic systems for actuating the clutch 32, drive system 34, and/or brake 36. Each of these systems may have operational limits for voltage, current, pressure, or temperature to ensure safe and reliable functioning of the drawworks 20, and various sensors may be included to generate signals reflective of sensed drawworks parameters 50 to ensure safe and reliable operation of the drawworks 20.

A travelling block controller 60 may be used to control the operation of the drawworks 20. The travelling block controller 60 may be a computer-based system programmed with various travelling block controller parameters 62 to ensure the safe operation of the drawworks 20. For example, the travelling block controller 60 may include one or more processors and associated memory programmed to perform a variety of computer-implemented functions (e.g., performing the methods, steps, calculations, and the like disclosed herein) to control the operation of the drawworks 20. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor(s), including data that can be retrieved, manipulated, created and/or stored by the processor(s) and instructions that can be executed by the processor(s).

As used herein, a "travelling block controller parameter" 62 is an operating limit associated with the drawworks 20 that is programmed or set into the travelling block controller 60 during calibration to limit the operation of the drawworks 20. For example, the travelling block controller 60 may be programmed to sense if the upper and lower travel limits for the travelling block 30 have been programmed or set into the travelling block controller 60 during calibration to ensure that the drawworks 20 does not damage the derrick 22 or mobile platform 12 by raising or lowering the travelling block 30 too far. Other examples sensors programmed in the travelling block controller 60 may detect calibration limits associated with the rate at which the drawworks 20 may extend or retract the drill string 24, the length of the drill string 24 remaining on the drum 26, the operating time of the drawworks 20, or the interval between scheduled maintenance of the drawworks 20. In particular embodiments, the sensors may further include a predetermined time limit by which the various limits associated with the drawworks 20 must be programmed or set into the travelling block controller 60 after energizing the travelling block controller 60. In this manner, the predetermined time limit may allow the travelling block controller 60 to be energized and briefly operated for the predetermined time limit while the specific limits associated with the drawworks 20 are programmed into the travelling block controller 60 during calibration.

Referring to FIG. 2, the various sensors previously described with respect to the drill rig parameters 40, the drawworks parameters 50, and/or the travelling block controller parameters 60 are collectively referred to as an interlock sensor 70. In this manner, the interlock sensor 70 receives at least one of a drill rig parameter 40, a drawworks parameter 50, or a travelling block controller parameter 62, as previously described. The interlock sensor 70 then generates an interlock signal 72 that is reflective of the particular sensed parameter. For example, in the case of the drill rig parameter 40, the interlock signal 72 may be reflective of the horizontal angle of the drill rig 10 or a locked condition of the derrick 22 that prevents the derrick 22 from retracting. In the case of the drawworks parameter 50, the interlock signal 72 may be reflective of a fluid pressure for operating the drawworks 50. In the case of the travelling block controller parameter 62, the interlock signal 72 may reflect whether one or more operating limits for the drawworks 20 have been programmed into the travelling block controller 60 within the predetermined time limit after energizing the travelling block controller 60.

As shown in FIG. 2, an interlock 80 is operably connected to the travelling block controller 60. The interlock 80 receives the interlock signal 72 and enables or disables operation of the travelling block controller 60 and/or the drawworks 20 if the interlock signal 72 meets a predetermined criteria. For example, if the interlock signal 72 reflects that the horizontal angle of the drill rig 10 is greater than an operational limit or that the derrick 22 is unlocked, then the interlock 80 may disable the travelling block controller 60 and/or drawworks 20 to prevent operation of the drawworks 20. As another example, if the interlock signal 72 reflects that a fluid pressure for operating the drawworks 50 is outside a required operating limit, then the interlock 80 may disable the travelling block controller 60 and/or drawworks 20 to prevent operation of the drawworks 20. In the case of the travelling block controller parameter 62, if the interlock signal 72 reflects that one or more operating limits for the drawworks 20 have not been programmed into the travelling block controller 60 within the predetermined time limit after energizing the travelling block controller 60, then the interlock 80 may disable the travelling block controller 60 and/or drawworks 20 to prevent operation of the drawworks 20. One of ordinary skill in the art will readily appreciate that each example is provided for illustration purposes only, and the actual functioning of the interlock 80 may be based on some or all of the sensed parameters and enable or disable various aspects of the travelling block controller 60 and/or drawworks 20, and the scope of the present invention is not limited to any particular sensed parameter unless specifically recited in the claims.

In particular embodiments, the interlock 80 may be an electrical component, such as breaker or relay, installed between the travelling block controller 60 and the drawworks 20 that electrically permits or prevents communication between the travelling block controller 60 and the drawworks 20. In other particular embodiments, the interlock 80 may be a mechanical device, such as locking bar or clamp, that mechanically permits or prevents operation of the drawworks 20 or movement of the drum 26. For example, the interlock 80 may actuate the brake 36 to prevent rotation of the drum 26 regardless of the operation of the travelling block controller 60 and/or drawworks 20. Alternately or in addition, the interlock 80 may physically disable the drive system 34 by preventing the clutch 32 from coupling the drive system 34 to the drum 26 to prevent the drawworks 20 from rotating the drum 26. In still further embodiments, the interlock 80 may actuate an alarm 82 to provide a visual or audible indication that a sensed parameter has produced an interlock signal 72 that meets the predetermined criteria.

In still further embodiments, the interlock 80 may be programming or circuitry incorporated into the travelling block controller 60 that enables or disables the travelling block controller 60 from operating. In each embodiment, the interlock 80 receives the interlock signal 72 and enables or disables operation of the travelling block controller 60 and/or drawworks 20 if the interlock signal 72 meets the predetermined criteria.

Figure 3:
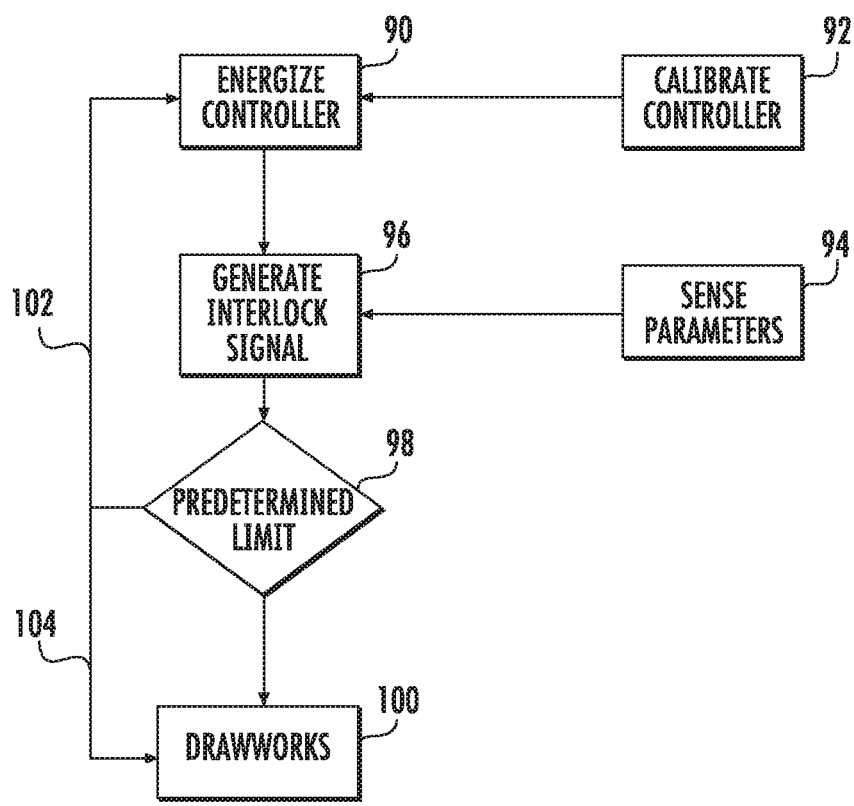
FIG. 3 is a flow diagram of a method for operating the drill rig according to one embodiment of the present invention.

FIG. 3 provides a flow diagram of a method for operating the drill rig 10 as previously described according to one embodiment of the present invention. At block 90, the method may include energizing the travelling block controller 60 that controls the operation of the drawworks 20. Once energized, the travelling block controller 60 may be calibrated by programming or setting into the travelling block controller 60 one or more operating limits for the drawworks 20 (i.e., the travelling block controller parameters 62), as shown in block 92. The method may further include sensing one or more of the drill rig parameters 40, drawworks parameters 50, or travelling block controller parameters 62 (block 94) and generating the interlock signal 72 reflective of at least one of the sensed parameters (block 96). For example, the interlock signal 72 may be reflective of the horizontal angle of the drill rig 10, the locked condition of the derrick 22, a fluid pressure for operating the drawworks 20, or an operating limit for the drawworks 20 set into the travelling block controller 60.

At block 98, the method may compare the interlock signal 72 to a predetermined limit to enable or disable operation of the travelling block controller 60 and/or drawworks 20. For example, if the interlock signal 72 does not meet the predetermined limit, indicating safe and reliable operations, then the method may enable the travelling block controller 60 to operate the drawworks 20 normally (block 100). However, if the interlock signal 72 meets the predetermined criteria, the method may disable the travelling block controller 60 (line 102) and/or disable the drawworks 20 (line 104). As previously described, in particular embodiments, the method may disable the drawworks 20 by actuating the brake 36, disabling the drive system 34, and/or actuating the alarm 82. In this manner, the travelling block controller 60 and/or the drawworks 20 may only operate when the interlock signal 72 does not meet the predetermined limit, and the interlock 80 disables the travelling block controller 60 and/or the drawworks 20 when the interlock signal 72 meets the predetermined limit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A drill rig, comprising:
    a drawworks comprising a drum operably connected to a drive system and a brake;
    a derrick;
    a drill string that extends from the drum of the drawworks, along the derrick, to a block and tackle arrangement holding a travelling block, wherein operation of the drawworks causes the drum to release or retract the drill string;
    a travelling block controller that controls the operation of the drawworks;
    an interlock sensor that senses a sensed parameter, wherein the sensed parameter is at least one of a horizontal angle of the drill rig, a locked condition of the derrick that prevents the derrick from retracting, a locked condition of the derrick that prevents the derrick from retracting, or an operating limit for the drawworks set into the travelling block controller within a predetermined time of energizing the travelling block controller;
    an interlock signal generated by the interlock sensor, wherein the interlock signal is reflective of the sensed parameter; and
    an interlock operably connected to the travelling block controller, wherein the interlock receives the interlock signal and disables operation of at least one of the travelling block controller or the drawworks if the interlock signal meets a predetermined criteria.

2. The drill rig as in claim 1, wherein the sensed parameter further includes a fluid pressure for operating the drawworks.

3. The drill rig as in claim 1, wherein the interlock actuates the brake operably connected to the drum if the interlock signal meets the predetermined criteria.

4. The drill rig as in claim 1, wherein the interlock disables the drive system operably connected to the drum if the interlock signal meets the predetermined criteria.

5. The drill rig as in claim 1, further comprising an alarm operably connected to the interlock, wherein the interlock actuates the alarm if the interlock signal meets the predetermined criteria.

6. A drill rig, comprising:
    a drawworks comprising a drum operably connected to a drive system and a brake;
    a derrick;
    a drill string that extends from the drum of the drawworks, along the derrick, to a block and tackle arrangement holding a travelling block, wherein operation of the drawworks causes the drum to release or retract the drill string;
    a travelling block controller that controls the operation of the drawworks;
    an interlock sensor that generates an interlock signal, wherein the interlock signal is reflective of at least one of a horizontal angle of the drill rig, a locked condition of the derrick that prevents the derrick from retracting, or an operating limit for the drawworks set into the travelling block controller within a predetermined time of energizing the travelling block controller; and
    an interlock operably connected to the travelling block controller, wherein the interlock receives the interlock signal and disables operation of at least one of the travelling block controller or the drawworks if the interlock signal meets a predetermined criteria.

7. The drill rig as in claim 6, wherein the interlock actuates the brake operably connected to the drum if the interlock signal meets the predetermined criteria.

8. The drill rig as in claim 6, wherein the interlock disables the drive system operably connected to the drum if the interlock signal meets the predetermined criteria.

9. The drill rig as in claim 6, further comprising an alarm operably connected to the interlock, wherein the interlock actuates the alarm if the interlock signal meets the predetermined criteria.

10. A method for operating a drill rig, comprising:
    energizing a travelling block controller that controls the operation of a drawworks;
    generating an interlock signal reflective of at least one of a horizontal angle of the drill rig, a locked condition of a derrick that prevents the derrick from retracting, or an operating limit set into the travelling block controller within a predetermined time of energizing the travelling block controller; and
    disabling operation of at least one of the travelling block controller or the drawworks if the interlock signal meets a predetermined criteria.

11. The method as in claim 10, further comprising actuating a brake in the drawworks if the interlock signal meets the predetermined criteria.

12. The method as in claim 10, further comprising disabling a drive system in the drawworks operably connected to the drum if the interlock signal meets the predetermined criteria.

13. The method as in claim 10, further comprising actuating an alarm if the interlock signal meets the predetermined criteria.

* * * * *